United States Patent [19]
Sueyoshi

[11] Patent Number: 5,444,532
[45] Date of Patent: Aug. 22, 1995

[54] INTERFEROMETER APPARATUS FOR DETECTING RELATIVE MOVEMENT BETWEEN REFLECTING MEMBERS

[75] Inventor: Masafumi Sueyoshi, Tokyo, Japan
[73] Assignee: Nikon Corporation, Tokyo, Japan
[21] Appl. No.: 359,853
[22] Filed: Dec. 20, 1994

Related U.S. Application Data
[63] Continuation of Ser. No. 16,852, Feb. 12, 1993, abandoned.

[30] Foreign Application Priority Data
Feb. 25, 1992 [JP] Japan .................. 4-073489
Mar. 4, 1992 [JP] Japan .................. 4-082737

[51] Int. Cl.$^6$ ............................................. G01B 9/02
[52] U.S. Cl. .................... 356/349; 356/351; 356/358; 356/363
[58] Field of Search ............. 356/351, 358, 349, 363

[56] References Cited
U.S. PATENT DOCUMENTS

| | | | |
|---|---|---|---|
| 4,693,605 | 9/1987 | Sommargren | 356/351 |
| 4,802,765 | 2/1989 | Young et al. | 356/349 |
| 4,813,783 | 3/1989 | Torge | 356/358 |
| 4,859,066 | 8/1989 | Sommargren | 356/363 |
| 4,881,815 | 11/1989 | Sommargren | 356/358 |
| 4,930,894 | 6/1990 | Baldwin | 356/358 |
| 5,064,289 | 11/1991 | Bockman | 356/358 |
| 5,270,793 | 12/1993 | Chour et al. | 356/349 |

FOREIGN PATENT DOCUMENTS

| | | | |
|---|---|---|---|
| 61-223503 | 10/1986 | Japan | 356/358 |
| 63-228003 | 9/1988 | Japan | 356/358 |
| 1-307605 | 12/1989 | Japan | 356/358 |
| 3-223607 | 10/1991 | Japan | 356/351 |
| 4-282402 | 10/1992 | Japan | 356/358 |

*Primary Examiner*—William Mintel
*Assistant Examiner*—Minhloan Tran
*Attorney, Agent, or Firm*—Shapiro and Shapiro

[57] ABSTRACT

An interferometer apparatus includes a prism member provided with a polarization beam splitter surface and a reflecting surface. A light beam from a laser source is split into first and second light beams by the polarization beam splitter surface. The first light beam passes through a quarter wave plate and is incident on a first movable mirror. The second light beam is incident on a rectangular prism and reflected therefrom. The reflected second light beam passes through a half wave plate and is incident on an upper portion of the polarization beam splitter surface. The second light beam having passed through the surface is passed through the quarter wave plate and is incident on a second movable mirror.

27 Claims, 4 Drawing Sheets

INTERFEROMETER APPARATUS FOR DETECTING RELATIVE MOVEMENT BETWEEN REFLECTING MEMBERS

This is a continuation of application Ser. No. 08/016,852 filed Feb. 12, 1993, now abandoned.

BACKGROUND OF THE INVENTION

1. Field of the Invention

The present invention relates to an interferometer apparatus which can always perform stable measurement of, e.g., the movement or displacement amount of an object even when a change in temperature is involved.

2. Related Background Art

A laser interferometer is known as an instrument which can measure the amount of change in the relative distance between first and second points with high precision. When the difference between the optical path length of a first laser beam reflected from the first point and that of a second laser beam reflected from the second point changes, interference fringes or a beat signal also change. The laser interferometer is designed to convert such a change in interference fringes or in beat signal into count pulses. For example, by accumulating these count pulses, the relative distance between the first and second points can be obtained.

In this case, the optical path length of each laser beam is the product of the actual length of the optical path of the laser beam and the refractive index of a medium through which the beam passes. As disclosed in Japanese Laid-Open Patent Application No. 63-228003 for example, an optical path length is generally constituted by a portion based on a large number of optical paths of laser beams which pass through air having a small refractive index (close to 1), and a portion based on a large number of optical paths of laser beams which pass through a medium such as a glass medium having a large refractive index. If, therefore, the refractive index of the glass medium or the like changes with a change in the internal temperature of the medium due to a change in ambient temperature or a thermal change of a support member, the optical path difference changes even if the relative distance between the first and second points remains the same. As a result, a change in distance may be erroneously detected by the laser interferometer.

Recently, the laser interferometer has been used for applications demanding very high measurement precision, e.g., a displacement detecting portion of a projection exposure apparatus for the manufacture of semiconductor elements. It is, therefore, required that measurement errors caused by thermal factors be minimized. In Japanese Laid-Open Patent Application No. 63-228003 described above, the following interferometer is proposed as an interferometer which can reduce measurement errors caused by thermal factors and can detect a change in distance with high precision even at a high temperature.

FIG. 4A shows the conventional interferometer. Referring to FIG. 4A, a two-frequency laser source 1 emits a mixture of first and second beams in the X direction, which beams respectively have frequencies f1 and f2 (f2≠f1) and are linearly polarized in directions parallel and perpendicular to the drawing surface of FIG. 4A. A prism member 2 is formed by bonding a rectangular prism 3 to a parallelepiped prism 4 having parallelograms parallel to the drawing surface of FIG. 4A.

The interface between the rectangular prism 3 and the parallelepiped prism 4 serves as a polarization beam splitter surface 2a. One surface, of the parallelepiped prism 4, which is parallel to the surface 2a serves as a reflecting surface 2b. The reflecting surface 2b may be a mirror making use of total reflection. That is, the prism member 2 can be regarded as an optical member having the polarization beam splitter surface 2a and the reflecting surface 2b which are arranged parallel to each other. The prism member 2 is arranged such that the polarization beam splitter surface 2a is perpendicular to the drawing surface of FIG. 4A and crosses the X direction at 45°.

The laser beams (first and second beams) emitted from the laser source 1 are incident on the polarization beam splitter surface 2a of the prism member 2 at an incident angle of 45°. Of these beams, the first beam is a p-polarized beam with respect to the surface 2a and is transmitted therethrough to be incident on a reference mirror 6 through a λ/4 plate (quarter wave plate) 5. The first beam reflected by the reference mirror 6 is incident on the polarization beam splitter surface 2a of the prism member 2 again through the λ/4 plate 5. In this case, since the first beam reciprocates through the λ/4 plate 5, the beam becomes an s-polarized beam with respect to the surface 2a. For this reason, the first beam is reflected by the surface 2a to propagate toward a corner-cube prism 7.

The first beam reflected by the corner-cube prism 7 is incident on the polarization beam splitter surface 2a of the prism member 2 after the plane of polarization is rotated through 90° by a λ/2 plate (half wave plate) 8. The beam incident position is shifted from the exit position in a direction parallel to the surface of FIG. 4A. In this case, since the first beam is converted into a p-polarized beam by the λ/2 plate 8, the beam is transmitted through the surface 2a and is reflected by the reflecting surface 2b. The first beam is then incident on the reference mirror 6 through the λ/4 plate 5. The first beam reflected again by the reference mirror 6 passes through the λ/4 plate 5 and is reflected by the reflecting surface 2b of the prism member 2 so as to be incident on the polarization beam splitter surface 2a. At this time, since the first beam is converted into an s-polarized beam upon reciprocating through the λ/4 plate 5, the beam is reflected by the surface 2a and is incident on a receiver 10. An analyzer and a light-receiving element are incorporated in the receiver 10.

Of the laser beams from the laser source 1, incident on the polarization beam splitter surface 2a of the prism member 2, the second beam is an s-polarized beam with respect to the surface 2a. The second beam is reflected by the surface 2a and is then reflected by the reflecting surface 2b. Thereafter, the second beam is incident on a movable mirror 9 through the λ/4 plate 5. The movable mirror 9 is wider than the reference mirror 6, and is held in a region shifted therefrom in the X direction to be movable in the X direction. The second beam reflected by the movable mirror 9 is transmitted through the λ/4 plate 5 and is reflected again by the reflecting surface 2b of the prism member 2 to be incident on the polarization beam splitter surface 2a. In this case, since the second beam is converted into a p-polarized beam upon reciprocating through the λ/4 plate 5, the beam is transmitted through the polarization beam splitter surface 2a to propagate toward the corner-cube prism 7.

The second beam reflected by the corner-cube prism is incident on the polarization beam splitter surface a of the prism member 2 after the plane of polarization is rotated through 90° by the λ/2 plate 8. In this case, since the second beam is converted into an s-polarized beam by the λ/2 plate 8, the beam is reflected by the surface 2a to be incident on the movable mirror 9 through the λ/4 plate 5. The second beam reflected again by the movable mirror 9 is incident on the polarization beam splitter surface 2a of the prism member 2 through the λ/4 plate 5. At this time, since the second beam is converted into a p-polarized beam upon reciprocating through the λ/4 plate 5, the beam is transmitted through the surface 2a and is incident on the receiver 10. In the receiver 10, the polarization directions of the first and second beams respectively reflected twice by the reference mirror 6 and the movable mirror 9 are aligned by the analyzer so that the first and second beams are incident on the light-receiving element.

While the movable mirror 9 is at rest, a beat signal having a frequency $(f1-f2)$ is output from the light-receiving element of the receiver 10. When the movable mirror 9 moves, a frequency-modulated beat signal is output. Therefore, by accumulating such changes in frequency, the movement amount of the movable mirror 9 in the X direction with respect to the reference mirror 6 can be detected.

The optical paths of the first and second beams in the prism member 2 of the interferometer in FIG. 4A will be considered with reference to FIG. 4B. As shown in FIG. 4B, the first and second beams have optical paths T11 and T21, respectively, within the parallelepiped prism 4 of the prism member 2, excluding the common optical path. Within the rectangular prism 3, the first and second beams have optical paths T12 and T22, excluding the common path. Since $T11+T12=T21+T22$, the optical path lengths of the first and second beams are equal in the prism member 2 as a whole.

When, however, considering the parallelepiped prism 4 and the rectangular prism 3 separately, $T11>T21$ is established in the parallelepiped prism 4; and $T12<T22$, in the rectangular prism 3. Therefore, even if the parallelepiped prism 4 and the rectangular prism 3 have the same refractive index, the optical path length difference between the first and second beams changes if the temperatures of the two prisms differ from each other. As a result, in spite of the fact that the movable mirror 9 is at rest, this change is erroneously detected as a change in the movement amount of the mirror 9. That is, with the arrangement shown in FIG. 4A, when a temperature difference occurs between the optical members constituting the prism member 2, a measurement error is caused.

The present invention has been made in consideration of the above situation, and has as its object to provide an interferometer apparatus which can achieve a reduction in measurement error even when a temperature difference is present between optical members.

SUMMARY OF THE INVENTION

In order to achieve the above object, according to one aspect of the present invention, there is provided an interferometer apparatus for detecting a displacement amount of an object to be measured, comprising:

light source means for supplying light;

measurement reflecting means fixed to the object and arranged to be movable in a measurement direction;

reference reflecting means fixed to be parallel to the measurement reflecting means;

optical means for splitting the light from the light source means into light components, and forming a measurement optical path extending to the measurement reflecting means through a gas by using one of the light components, while forming a reference optical path extending, parallel to the measurement optical path, to the reference reflecting means through a gas by using the other light component; and detecting means for receiving light components having passed through the measurement optical path and the reference optical path, and detecting a displacement amount of the object, wherein the optical means includes an optical member having a light splitting surface for reflecting part of the light from the light source means and transmitting the remaining part of the light, and a reflecting surface formed to be perpendicular to the light splitting surface, and a deflecting member for deflecting a light component, reflected by the light splitting surface, toward the light splitting surface again, the light component which is emitted from the light source means and transmitted through the light splitting surface, forms one optical path of the measurement optical path and the reference optical path in cooperation with the light splitting surface, the reflecting surface, and the measurement reflecting means, and the light component which is emitted from the light source, reflected by the light splitting surface, and transmitted through the deflecting member, forms the other optical path, of the measurement optical path and the reference optical path, which is different from the one optical path, in cooperation with the light splitting surface, the reflecting surface, and the measurement reflecting means.

According to another aspect of the present invention, there is provided an interferometer apparatus for detecting a displacement amount of a target object to be measured, comprising:

light source means for supplying light;

optical means for splitting the light from the light source means into light components, and forming a measurement optical path extending to the target object through a gas by using one of the light components, while forming a reference optical path extending to a reference object through a gas by using the other light component; and detecting means for detecting a displacement amount of the target object by using the light components transmitted through the measurement optical path and the reference optical path, wherein the optical means includes an optical member having a light splitting surface for reflecting part of the light from the light source means and transmitting the remaining part of the light, and a reflecting surface formed to be perpendicular to the light splitting surface, and a deflecting member for deflecting a light component, reflected by the light splitting surface, toward the light splitting surface again, the light component which is emitted from the light source means and transmitted through the light splitting surface, forms one optical path of the measurement optical path and the reference optical path in cooperation with the light splitting surface, the reflecting surface, and the measurement reflecting means, and the light component which is emitted from the light source, reflected by the light splitting surface, and transmitted through the deflecting member, forms the other optical path, of the measurement optical path and the reference optical path, which is different from the one optical path, in cooperation with the light splitting surface, the reflecting surface, and the measurement reflecting means.

According to still another aspect of the present invention, there is provided an interferometer apparatus for detecting a relative movement amount between first and second objects, comprising:

light source means for supplying light;

optical means for splitting the light from the light source means into first and second beams, and forming a first optical path extending to the first object through a gas by using the first beam, while forming a second optical path extending, parallel to the first optical path, to the second object through a gas by using the second beam; and detecting means for detecting a relative movement amount between the first and second objects by using the first and second beams respectively passing through the first and second optical paths, wherein the optical means comprises an optical member having a light splitting surface for transmitting part of the light from the light source means as the first beam and reflecting the remaining part of the light as the second beam, and a reflecting surface formed to be perpendicular to the light splitting surface, and a deflecting member for deflecting the second beam, reflected by the light splitting surface, toward the light splitting surface again, the first beam transmitted through the light splitting surface forms the first optical path in cooperation with the light splitting surface, the reflecting surface, and the first object, and the second beam reflected by the light splitting surface and transmitted through the deflecting member forms the second optical path in cooperation with the light splitting surface, the reflecting surface, and the second object.

The characteristic features of the interferometer apparatus of the present invention having the above-described arrangement will be briefly described below. For example, as shown in FIG. 1A, when the light from the light source means (1) is incident on the light splitting surface (11a) of the optical means (11, 14, 17, 18), the light is split into the first beam passing through and the second beam reflected by the light splitting surface (11a), and the respective beams propagate toward the first reflecting means (15) as the first object and the second reflecting means (16) as the second object.

In this case, the optical means (11, 14, 17, 18) includes the optical member (11) having the light splitting surface (11a) and the reflecting surface (11b) perpendicular to the light splitting surface (11a), and the first beam reflected twice by the first reflecting means (15) and the second beam reflected twice by the second reflecting means (16) are mixed and detected by the detecting means (10). When the relative positions between the first reflecting means (15) and the second reflecting means (16) in the X direction change, the optical path lengths of the first and second beams change, resulting in a change in interference fringes or beat signal in the detecting means (10). Therefore, the relative movement amount (displacement amount) between the two reflecting means (15, 16) can be detected.

Note that either the first reflecting means (15) or the second reflecting means (16) may be fixed to a target object to serve as a measurement reflecting means capable of moving along a measurement direction X, while the other means may be used as a reference reflecting means fixed with respect to the measurement reflecting means, thus allowing detection of the movement amount (displacement amount) of the target object.

For example, as shown in FIG. 1B, the optical member (13) constituting part of the optical means of the interferometer apparatus of the present invention is formed to have the polarizing/splitting surface (11a), as the light splitting surface, and the reflecting surface (11b) which are perpendicular to each other. Since the first and second beams passing through the optical member (13) have the same optical path lengths, the optical path length difference between the first and second beams does not change even with a change in the internal temperature of the optical member (13). Therefore, measurement can be performed with higher precision.

Similarly, if the optical member (11) formed by joining one of the two orthogonal surfaces of the second optical member (12) to the polarizing/splitting surface (11a) of the optical member (13) is used, high-precision measurement can be performed, even with a change in temperature inside the optical member (11), for the following reasons. Since the optical path lengths of the first and second beams passing through the optical member (13) are equal, and the optical path lengths of the first and second beam passing through the optical member (12) are also equal, the optical path length difference between the first and second beam inside the optical member (11) does not change even with a change in temperature inside the optical member (11).

As described above, according to the present invention, since the optical path lengths of the respective beams passing through the optical members can be made equal, a high-precision interferometer apparatus can be realized, which suffers very few measurement errors even with a change in temperature in the optical member.

The above and other objects, features, and advantages of the present invention will be apparent from the following detailed description in conjunction with the accompanying drawings and the appended claims.

DESCRIPTION OF THE PREFERRED EMBODIMENTS

An interferometer apparatus according to an embodiment of the present invention will be described below with reference to FIGS. 1A and 1B. A laser source 1 and a receiver 10 in this embodiment are identical to those used in the conventional apparatus shown in FIG. 4A.

In the embodiment, the apparatus has the following optical arrangement. As shown in FIG. 1A, a beam from the laser source 1 is split into two beams. A first optical path extending to a first movable mirror 15 (first object) through a gas such as air is formed by using one of the beams, whereas a second optical path extending, parallel to the first optical path, to a second movable mirror 16 (second object) through a gas such as air is formed by using the other beam. By detecting beams traveling through the respective optical paths with the receiver 10, the relative displacement or movement amount of each movable mirror is obtained. In the apparatus of the embodiment, a two-story structure is employed so that the second optical path is formed above the first optical path.

Figure 1A:
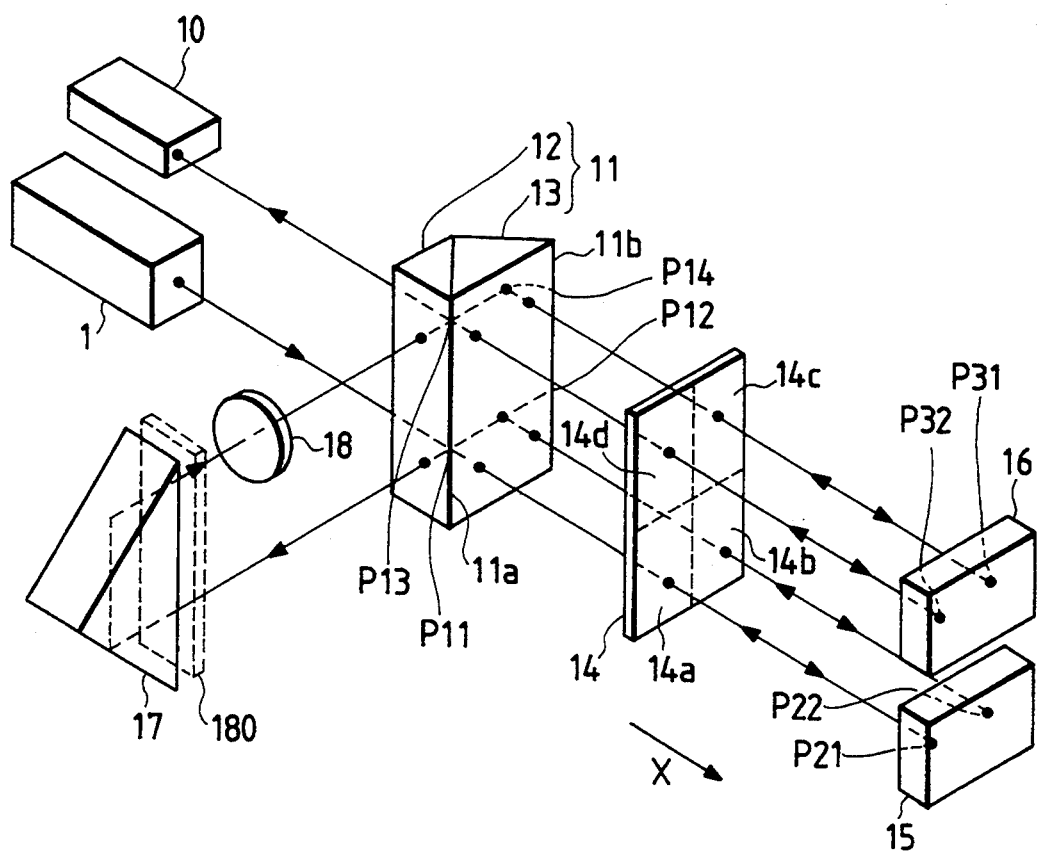
FIG. 1A is a perspective view of an interferometer apparatus according to the first embodiment of the present invention.
Figure 1B:
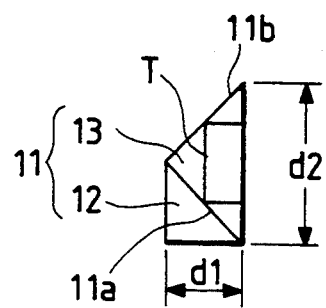
FIG. 1B is a plan view of an optical member 11 in FIG. 1A.

FIG. 1A shows a main portion of a laser interferometer in the embodiment. Referring to FIG. 1A, a prism member 11 is formed by bonding a first rectangular prism 12 to a second rectangular prism 13. As shown in FIG. 1B, the rectangular prism 12 having orthogonal sides each having a length d1 is bonded to the rectangular prism 13 having an oblique side of a length d2 (=2·d1) in such a manner that an oblique side of the prism 12 is aligned with one of two orthogonal sides of the prism 13, thereby forming the prism member 11. The interface between the prisms 12 and 13 is used as a polarization beam splitter surface 11a, while a surface, of the rectangular prism 13, having the other side of the two orthogonal sides is used as a reflecting surface 11b. This reflecting surface 11b may make use of total reflection.

Figure 1C:
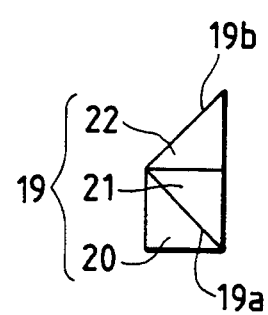
FIG. 1C is a plan view showing another example of the optical member 11 in FIG. 1A.

It is, therefore, essential that the polarization beam splitter surface 11a and the reflecting surface 11b of the prism member 11 are arranged to be perpendicular to each other. For example, as shown in FIG. 1C, if three rectangular prisms 20 to 22 are bonded to each other to form a prism member 19 such that the interface between the prisms 20 and 21 is used as a polarization beam splitter surface 19a, while an outer surface of the prism 22 is used as a reflecting surface 19b, this prism member 19 can be used in place of the prism member 11.

Referring to FIG. 1A again, provided that the X direction is defined as a direction in which two laser beams (first and second beams) having different frequencies are emitted from the laser source 1, the prism member 11 is arranged such that the polarization beam splitter surface 11a of the prism member 11 crosses the X direction at 45°. In addition, a λ/4 plate 14 is disposed in the X direction, and first and second movable mirrors 15 and 16, each constituted by a plane mirror, are disposed to be movable in the X direction. These movable mirrors 15 and 16 are disposed to be shifted from each other in a direction perpendicular to the X direction.

A rectangular prism (deflecting member) 17 is disposed in a direction in which a laser beam from the laser source 1 is reflected by a region P11 of the polarization beam splitter surface 11a of the prism member 11. In this case, in order to return the laser beam to a region P13 of the polarization beam splitter surface 11a upon two total reflections inside the rectangular prism 17, the rectangular prism 17 is positioned such that the regions P11 and P13 are located on a line parallel to the ridge defined by the polarization beam splitter surface 11a and reflecting surface 11b of the prism member 11. In addition, a λ/2 plate 18 is disposed midway along one of the optical paths between the prism member 11 and the rectangular prism 17. Note that a λ/4 plate 180 may be disposed in place of the λ/2 plate 18 so as to cover the entire incident and exit planes of the rectangular prism 17 (i.e., to cover the two optical paths formed between the prism member 11 and the rectangular prism 17). In this case, the prism member 11, the λ/4 plate 180, and the rectangular prism 17 may be integrally arranged. The receiver 10 is disposed in a direction in which a laser beam from the rectangular prism 17 is reflected by the region P13 of the polarization beam splitter surface 11a.

An operation of the embodiment will be described next. The laser beams (first and second beams) emitted from the laser source 1 are incident on the region P11 of the polarization beam splitter surface 11a of the prism member 11 at an incident angle of 45°. Of the incident beams, the first beam as a p-polarized beam with respect to the surface 11a is transmitted through the surface 11a and is incident on a region P21 of the first movable mirror 15 through the λ/4 plate 14. The first beam reflected by the movable mirror 15 is incident on the polarization beam splitter surface 11a of the prism member 11 again through the λ/4 plate 14. In this case, since the first beam is converted into an s-polarized beam with respect to the surface 11a upon reciprocating through the λ/4 plate 14, the beam is reflected by the region P11 of the surface 11a to propagate toward a region P12 of the reflecting surface 11b.

The first beam reflected by the reflecting surface 11b is incident on a region P22 of the first movable mirror 15 through the λ/4 plate 14. The first beam reflected by the region P22 is incident on the region P11 of the polarization beam splitter surface 11a through the λ/4 plate 14 and the region P12 of the reflecting surface 11b of the prism member 11. In this case, since the first beam is converted into a p-polarized beam, the beam is transmitted through the polarization beam splitter surface 11a to propagate toward the rectangular prism 17.

The first beam reflected by the rectangular prism 17 is incident on the region P13 of the polarization beam splitter surface 11a of the prism member 11 after the plane of polarization is rotated through 90° by the λ/2 plate 18. In this case, since the first beam is converted into an s-polarized beam by the λ/2 plate 18, the beam is reflected by the region P13 of the surface 11a to be incident on the receiver 10.

Of the laser beams emitted from the laser source 1 and incident on the region P11 of the polarization beam splitter surface 11a of the prism member 11, the second beam as an s-polarized beam with respect to the surface 11a is reflected by the region P11 of the surface 11a to propagate toward the rectangular prism 17. The second beam reflected by the rectangular prism 17 is incident on the region P13 of the polarization beam splitter surface 11a of the prism member 11 through the λ/2 plate 18. Since the second beam is converted into a p-polarized beam by the λ/2 plate 18, the beam is transmitted through the region P13 of the surface 11a and is then reflected by a region P14 of the reflecting surface 11b. Thereafter, the second beam is incident on a region P31 of the second movable mirror 16 through the λ/4 plate 14.

The second beam reflected by the region P31 of the second movable mirror 16 is transmitted through the λ/4 plate 14 and is reflected again by the region P14 of the reflecting surface 11b to be incident on the region P13 of the polarization beam splitter surface 11a. In this case, since the second beam is converted into an s-polarized beam upon reciprocating through the λ/4 plate 14, the beam is reflected by the region P13 of the surface 11a. Subsequently, the second beam is incident on a region P32 of the second movable mirror 16 through the λ/4 plate 14. The second beam reflected by the region P32 returns to the region P13 of the polarization beam splitter surface 11a through the λ/4 plate 14. At this time, since the second beam is converted into a p-polarized beam upon reciprocating through the λ/4 plate 14, the beam is transmitted through the region P13 of the surface 11a and is incident on the receiver 10. In the receiver 10, the polarization directions of the first and second beams respectively reflected twice by the first and second movable mirrors 15 and 16 are aligned by the analyzer so that the first and second beams are incident on the light-receiving element.

While the first and second movable mirrors 15 and 16 are at rest relative to each other in the X direction, the light-receiving element of the receiver 10 outputs a beat signal having a frequency (f1−f2). When the two mirrors move relative to each other in the X direction, a frequency-modulated beam signal is output. Therefore, by accumulating such changes in frequency, the relative movement amount between the first and second movable mirrors 15 and 16 in the X direction can be detected.

In the embodiment, the two reflecting members, i.e., the first and second movable mirrors 15 and 16, are moved relative to each other. However, one of the two reflecting members (15 and 16) may be fixed as a reference (standard) reflecting mirror, while the other reflecting mirror is arranged, as a reflecting mirror for measurement, to be movable in a measurement direction so that only the displacement amount of the measurement reflecting mirror is detected by the receiver 10. In this case, the measurement reflecting mirror which moves in the measurement direction is fixed to an object to be measured.

In the embodiment, as is apparent from FIG. 1A, the first and second beams pass through the same optical path inside within the rectangular prism 12 of the prism member 11. Within the rectangular prism 13 of the prism member 11, the first and second beams pass through optical paths having the same length but vertically separated from each other (i.e., an optical path T in FIG. 1B). Therefore, the optical path length difference between the first and second beams does not change even when a temperature difference is present between the rectangular prisms 12 and 13.

In addition, as shown in FIG. 1A, if the X-direction length of the rectangular prism 13 (the distance between the vertex and bottom surface of the rectangular prism 13 in the X direction) is represented by d1, and the length of the rectangular prism 13 in a direction perpendicular to the X direction (the width of the bottom surface of the rectangular prism 13) is represented by d2, d2=2×d1 is established. For this reason, if the beam size of the first and second beams is represented by $\phi$, in the embodiment, the X-direction length of the prism member 11 suffices to be almost equal to the beam size $\phi$.

Figure 4A:
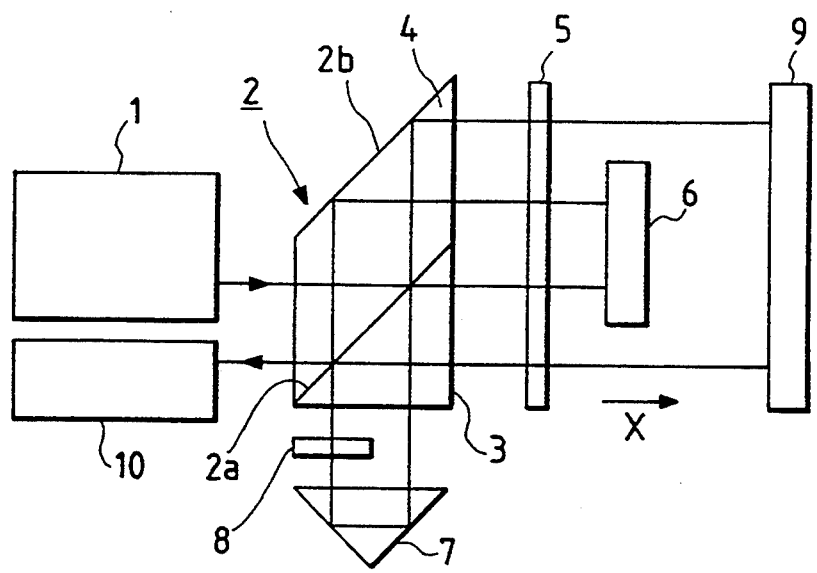
FIG. 4A is a plan view of a conventional interferometer apparatus.
Figure 4B:
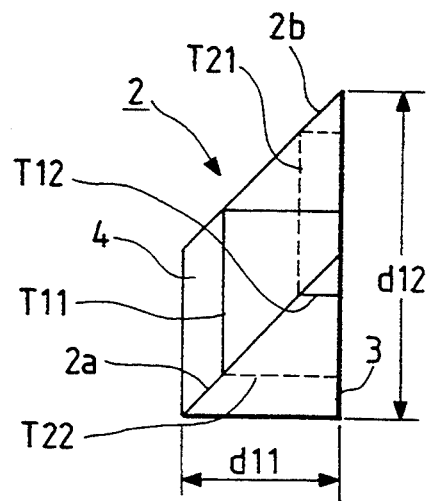
FIG. 4B is a plan view of a conventional optical member 2 in FIG. 4A.

In contrast to this, if the X-direction length of the conventional prism member 2 shown in FIG. 4A is represented by d11, and the length of a surface, of the second rectangular prism 13, on the side of an object to be measured, in a direction perpendicular to the X direction is represented by d12, d12=2×d11 is established. For this reason, if the beam size of the first and second beams is represented by $\phi$, the X-direction length of the conventional prism member 2 shown in FIG. 4A must be almost equal to the beam size $\phi$.

Theoretically, therefore, the optical paths of the two beams inside the prism member 11 in the embodiment are about ½ those of the two beams inside the conventional prism member 2, thus reducing the optical path length difference due to variations in internal temperature. For this reason, high-precision displacement detection can always be performed. In addition, since the volume of the prism member 11 is about ½ that of the prism member 2, the overall interferometer of the embodiment can be reduced in size.

In the embodiment shown in FIG. 1A, the λ/4 plate 14 is constituted by a single member. It is, however, apparent that λ/4 plates 14a to 14d indicated by the broken lines in FIG. 1A may be respectively arranged in four optical paths through which beams reciprocate upon reflection at the regions P21 and P22 of the first movable mirror 15 and by the regions P31 and P32 of the second movable mirror 16.

Furthermore, in the embodiment shown in FIG. 1A, the laser source 1 and the receiver 10 are arranged on the first surface side of the rectangular prism 12 having two orthogonal surfaces, and the λ/2 plate 18 and the rectangular prism 17 are arranged on the second surface side of the prism 12. However, the laser source 1 and the receiver 10 may be arranged on the second surface side, while the λ/2 plate 18 and the rectangular prism 17 are arranged on the first surface side. In addition, the positions of the laser source 1 and the receiver 10 may be switched from each other.

The second embodiment of the present invention will be described below with reference to FIG. 2. In the second embodiment, the resolution of the apparatus shown in FIG. 1A is increased. The same reference numerals in FIG. 2 denote the same parts as in FIG. 1A, and a description thereof will be omitted.

Figure 2:
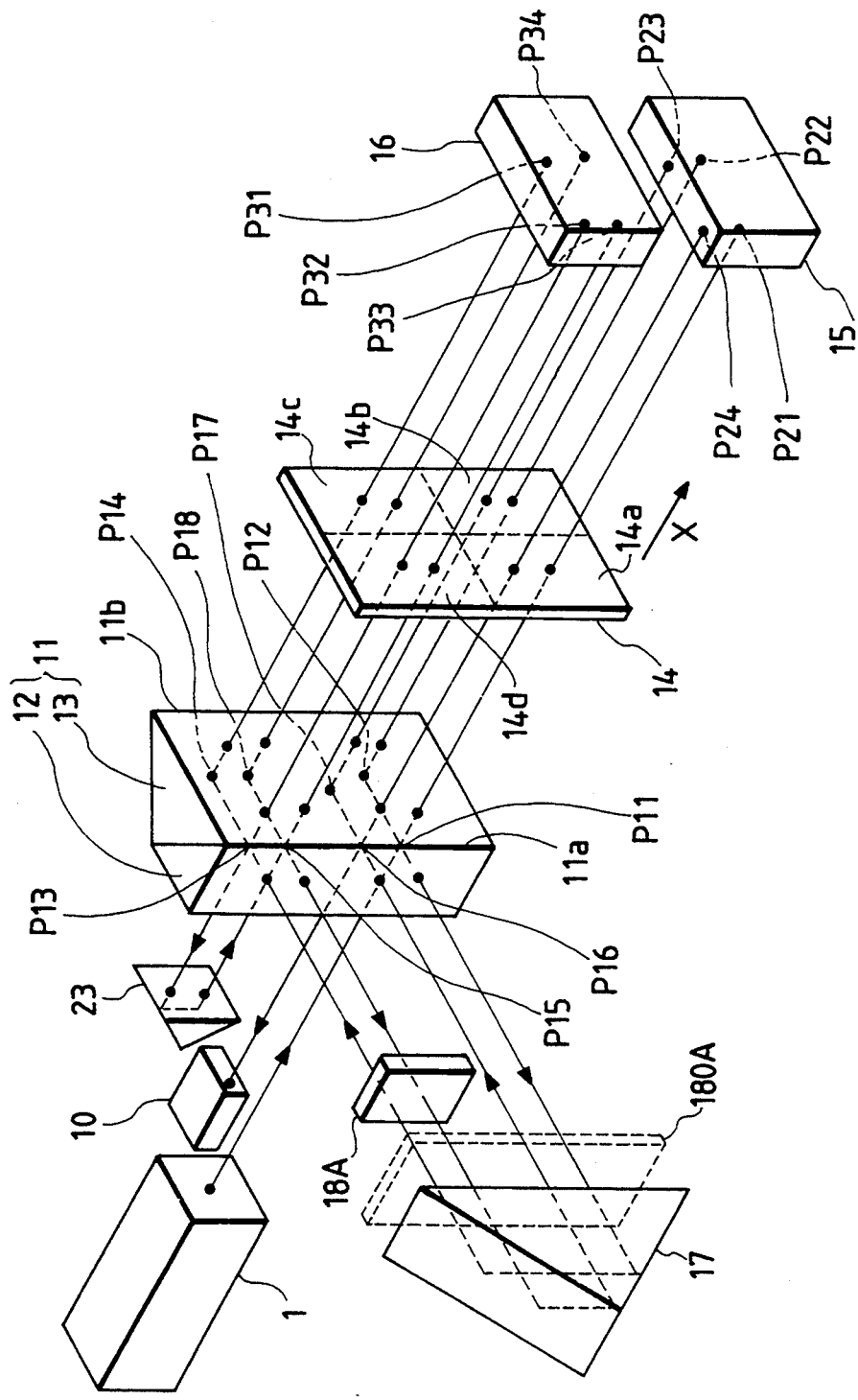
FIG. 2 is a perspective view showing the second embodiment of the present invention.

FIG. 2 shows the arrangement of a main portion of a laser interferometer of the second embodiment. Referring to FIG. 2, a rectangular prism 23 serves to reflect first and second beams emerging from a region P13 of a polarization beam splitter surface 11a of a prism member 11 to cause the beams to be incident on a region P15 of the polarization beam splitter surface 11a. The region P15 is positioned with respect to the region P13 to be parallel to the ridge defined by the polarization beam splitter surface 11a and a reflecting surface 11b. In addition, the circular λ/2 plate 18 in FIG. 1 is replaced by a rectangular λ/2 plate 18A.

A receiver 10 is disposed in a direction in which a laser beam is reflected by a region P16, provided that the region P16 is at a position where a laser beam from the region P15 of the polarization beam splitter surface 11a, which propagates to a rectangular prism 17 and is reflected thereby, is incident on the polarization beam splitter surface 11a.

An operation of this embodiment will be described below. The operation of the optical paths extending from a laser source 1 to the region P13 of the polarization beam splitter surface 11a of the prism member 11 is the same as that described with reference to FIG. 1A. The first beam emerging from the region P13 of the polarization beam splitter surface 11a and propagating toward a rectangular prism 23 is reflected by the rectangular prism 23 and is incident on the region P15 of the polarization beam splitter surface 11a. Since the first beam is an s-polarized beam, the beam is reflected by the polarization beam splitter surface 11a and propagates toward the rectangular prism 17 through the λ/2 plate 18A. The first beam reflected by the rectangular prism 17 is incident on the region P16 of the polarization beam splitter surface 11a of the prism member 11. The first beam converted into a p-polarized beam by the λ/2 plate 18A is directly transmitted through the region P16 of the surface 11a and is subsequently incident on a region P17 of the reflecting surface 11b. After being reflected by the region P17, the first beam is incident on a region P23 of a first movable mirror 15 through a λ/4 plate 14.

The first beam reflected by the first movable mirror 15 is incident on the region P16 of the polarization beam splitter surface 11a through the λ/4 plate 14 and the region P17 of the reflecting surface 11b to be reflected thereby. Thereafter, the first beam is incident on a region P24 of the first movable mirror 15 through the λ/4 plate 14. The first beam reflected by the first movable mirror 15 returns to the region P16 of the polarization beam splitter surface 11a through the λ/4 plate 14. Since the first beam is converted into a p-polarized beam, the beam is directly transmitted through the surface 11a to be incident on the receiver 10.

On the other hand, the second beam emerging from the region P13 of the polarization beam splitter surface 11a and propagating toward the rectangular prism 23 is reflected by the rectangular prism 23 and is incident on the region P15 of the polarization beam splitter surface 11a. Since the second beam is a p-polarized beam, the beam is transmitted through the polarization beam splitter surface 11a and is incident on a region P33 of a second movable mirror 16 through the λ/4 plate 14. The second beam reflected by the second movable mirror 16 is incident on the region P15 of the polarization beam splitter surface 11a through the λ/4 plate 14 and is reflected by the surface 11a. Thereafter, the second beam is reflected by a region P18 of the reflecting surface 11b and is incident on a region P34 of the second movable mirror 16 through the λ/4 plate 14. The second beam reflected by the region P34 is incident on the region P15 of the polarization beam splitter surface 11a through the λ/4 plate 14 and the region P18 of the reflecting surface 11b.

At this time, since the second beam is converted into a p-polarized beam, the beam is directly transmitted through the region P15 and is incident on the rectangular prism 17 through the λ/2 plate 18A. The second beam reflected by the rectangular prism 17 is incident on the region P16 of the polarization beam splitter surface 11a of the prism member 11. Since the second beam is converted into an s-polarized beam by the λ/2 plate 18A, the beam is reflected by the region P16 of the surface 11a and is incident on the receiver 10. A mixture of the first beam reflected by the first movable mirror 15 four times and the second beam reflected by the second movable mirror 16 four times is incident on the receiver 10. Therefore, if, for example, N count pulses are obtained with respect to a predetermined relative movement amount between the first and second movable mirrors 15 and 16 in the X direction in the embodiment shown in FIG. 1A, count pulses twice N count pulses, i.e., 2N count pulses, can be obtained in the embodiment shown in FIG. 2. That is, the resolution of the embodiment in FIG. 1A is doubled in the embodiment in FIG. 2.

In the second embodiment, the two reflecting members, i.e., the first and second movable mirrors 15 and 16, are moved relative to each other. However, one of the two reflecting members (15 and 16) may be fixed as a reference (standard) reflecting mirror, while the other reflecting mirror may be arranged, as a reflecting mirror for measurement, to be movable in a measurement direction so that only the displacement amount of the measurement reflecting mirror is detected by the receiver 10. In this case, the measurement reflecting mirror which moves in the measurement direction is fixed to an object to be measured.

In the embodiment shown in FIG. 2, the optical path lengths of the first and second beams inside the rectangular prisms 12 and 13 constituting the prism member 11 are also equal. Therefore, the optical path length difference between the two beams does not change even when a temperature difference is present between the rectangular prisms 12 and 13, causing no measurement error.

In the embodiment shown in FIG. 2, the resolution can be further increased by placing another rectangular prism or a corner-cube prism at the position where the receiver 10 is placed, and shifting the position of the receiver 10.

In the embodiment shown in FIG. 2, the λ/4 plate 14 is constituted by a single member. It is, however, apparent that a λ/4 plate 14a can be disposed in two optical paths through which beams reciprocate upon reflection at the regions P21 and P24 of the first movable mirror 15; a λ/4 plate 14b, in two optical paths through which beams reciprocate upon reflection at the regions P22 and P23 of the first movable mirror 15; a λ/4 plate 14c, in two optical paths through which beams reciprocate upon reflection at the regions P31 and P34 of the second movable mirror 16; and a λ/4 plate 14d, in two optical paths through which beams reciprocate upon reflection at the regions P32 and P33 of the second movable mirror 16, as indicated by the broken lines in FIG. 2. In addition, a λ/4 plate 180A which can cover the two optical paths formed between the prism member 11 and the rectangular prism 17 may be used in place of the λ/2 plate 18A. Furthermore, the prism member 11, the λ/4 plate 180A, and the rectangular prism 17 may be integrally arranged.

In each embodiment described above, the present invention is applied to a heterodyne laser interferometer. However, the present invention can also be applied to a homodyne interferometer. In addition, a corner-cube prism and the like may be used in place of the rectangular prisms 17 and 23.

Figure 3A:
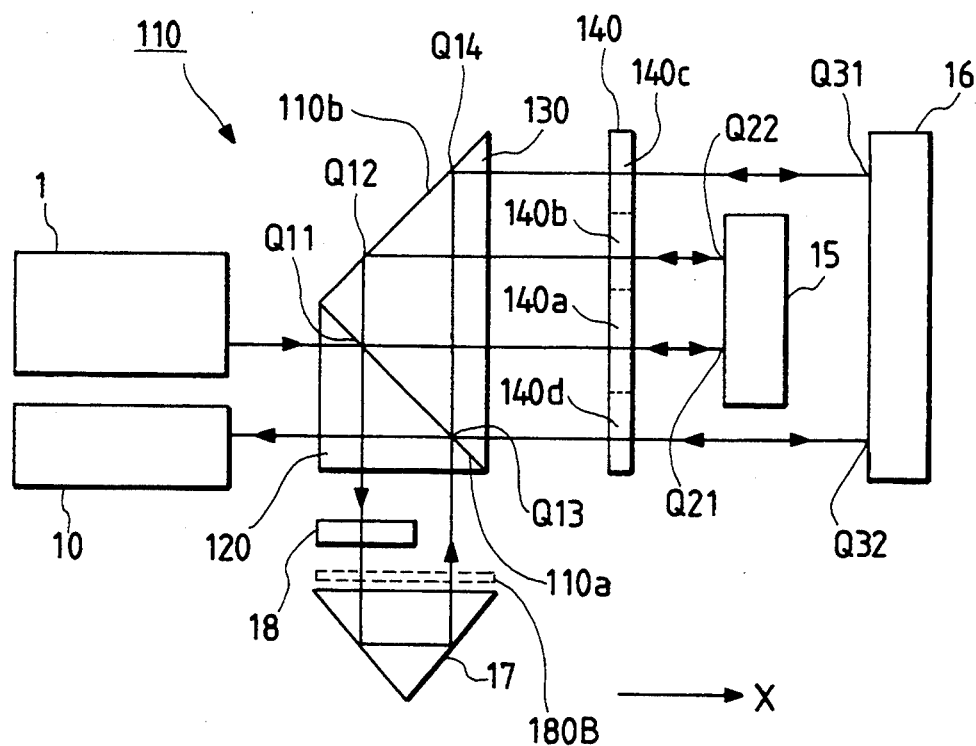
FIG. 3A is a perspective view of an interferometer apparatus according to the third embodiment of the present invention.

FIG. 3A shows an interferometer apparatus according to the third embodiment of the present invention. In this embodiment, the apparatus of the first embodiment shown in FIG. 1A is arranged to be flat. In the third embodiment, the apparatus has the following optical arrangement. As shown in FIG. 3A, a beam from the laser source 1 is split into two beams. A reference optical path extending to a stationary mirror 15 (standard object) through a gas such as air is formed by using one of the beams, whereas a measurement optical path extending, parallel to the reference optical path, to a movable mirror 16 (a reflecting mirror fixed to an object to be measured) through a gas such as air is formed by using the other beam. By detecting beams traveling through the respective optical paths with a receiver 10, the relative displacement or movement amount of the movable mirror 16 with respect to the stationary mirror 15 can be obtained.

Figure 3B:
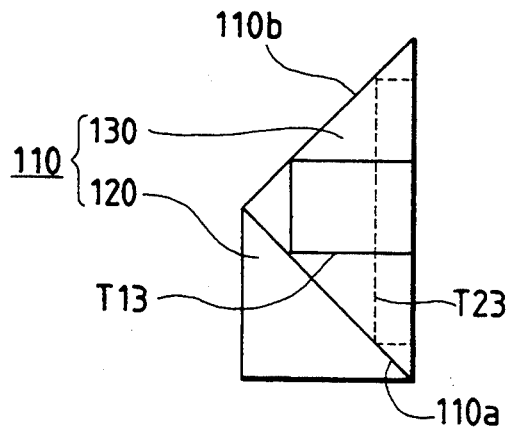
FIG. 3B is a plan view of an optical member 110 in FIG. 3A.

FIG. 3A shows a main portion of a laser interferometer of the third embodiment. Referring to FIG. 3A, a prism member 110 is formed by bonding a first rectangular prism 120 to a second rectangular prism 130. As shown in FIG. 3B, the inclined surface of the rectangular prism 120 is bonded to one of the two orthogonal surfaces of the rectangular prism 130, thus forming the prism member 110. The interface between the prisms 120 and 130 serves as a polarization beam splitter surface 110a, while the other surface of the two orthogonal surfaces of the rectangular prism 130 serves as a reflecting surface 110b. This reflecting surface 110b may make use of total reflection.

Figure 3C:
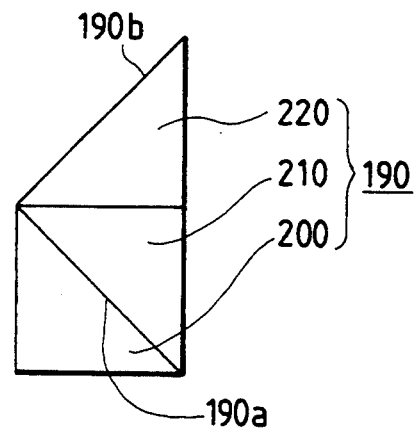
FIG. 3C is a plan view showing another example of the optic member 110 in FIG. 3A.

It is, therefore, essential that the polarization beam splitter surface 110a and reflecting surface 110b of the prism member 110 are arranged to be perpendicular to each other. For example, as shown in FIG. 3C, three rectangular prisms 200 to 220 may be bonded to each other to form a prism member 190 so that the interface between the rectangular prisms 200 and 210 is used as a polarization beam splitter surface 190a, while the inclined surface of the rectangular prism 220 is used as a reflecting surface 190b. With this structure, the prism member 190 can be used in place of the prism member 110.

Referring to FIG. 3A again, provided that the X direction is a direction in which two laser beams (first and second beams) having different frequencies are emitted from the laser source 1, the prism member 110 is disposed such that the polarization beam splitter surface 110a of the prism member 110 crosses the X direction at 45°. In addition, a λ/4 plate 140 is disposed in the X direction, and the stationary mirror 15 constituted by a plane mirror is fixed. The movable mirror 16 constituted by a plane mirror is then disposed to be movable in the X direction. The width of the movable mirror 16 in a direction perpendicular to the X direction and parallel to the drawing surface of FIG. 3A is set to be larger than the width of the stationary mirror 15.

A rectangular prism 17 is disposed in a direction in which the laser beams from the laser source 1 are reflected by a region Q11 of the polarization beam splitter surface 110a of the prism member 110. In this case, provided that the laser beams are caused to return to a region Q13 of the polarization beam splitter surface 110a upon two total reflections inside the rectangular prism 17, the rectangular prism 17 is positioned such that the regions Q11 and Q13 are located at different positions on a straight line perpendicular to the reflecting surface 110b, and the region Q11 is located closer to the reflecting surface 110b than the region Q13. In addition, a λ/2 plate 18 is disposed midway along one of the optical paths between the prism member 110 and the rectangular prism 17. Instead of the λ/2 plate 18, a λ/4 plate 180B may be disposed to cover the entire incident and exit surfaces of the rectangular prism 17 (i.e., to cover the two optical paths formed between the prism member 110 and the λ/2 plate 18). In this case, the prism member 110, the λ/4 plate 180B, and the rectangular prism 17 may be integrally arranged. In addition, the receiver 10 is disposed in a direction in which the laser beams from the rectangular prism 17 are reflected by the region Q13 of the polarization beam splitter surface 110a.

An operation of the third embodiment will be described next. The laser beams (first and second beams) from the laser source 1 are incident on the region Q11 of the polarization beam splitter surface 110a of the prism member 110 at an incident angle of 45°. Of these beams, the first beam p-polarized with respect to the polarization beam splitter surface 110a is directly transmitted through the surface 110a and is incident on a region Q21 of the stationary mirror 15 through the λ/4 plate 140. The first beam reflected by the stationary mirror 15 is incident on the polarization beam splitter surface 110a of the prism member 110 again through the λ/4 plate 140. In this case, since the first beam is converted into an s-polarized beam with respect to the surface 110a upon reciprocating through the λ/4 plate 140, the beam is reflected by the region Q11 of the surface 110a to propagate toward a region Q12.

The first beam reflected by the reflecting surface 110b is incident on a region Q22 of the stationary mirror 15 through the λ/4 plate 140. The first beam reflected by the region Q22 is incident on the region Q11 of the polarization beam splitter surface 110a through the λ/4 plate 140 and the region Q12 of the reflecting surface 110b of the prism member 110. In this case, since the first beam is converted into a p-polarized beam, the beam is directly transmitted through the polarization beam splitter surface 110a. Thereafter, the first beam propagates toward the rectangular prism 17 after the plane of polarization is rotated through 90° by the λ/2 plate 18.

The first beam reflected by the rectangular prism 17 is incident on the region Q13 of the polarization beam splitter surface 110a of the prism member 110. In this case, since the first beam is converted into an s-polarized beam by the λ/2 plate 18, the beam is reflected by the region Q13 of the surface 110a to be incident on the receiver 10.

Of the laser beams emitted from the laser source 1 and incident on the region Q11 of the polarization beam splitter surface 110a of the prism member 110, the second beam s-polarized with respect to the surface 110a is reflected by the region Q11 of the surface 110a and is subsequently transmitted through the λ/2 plate 18 to propagate toward the rectangular prism 17. The second beam reflected by the rectangular prism 17 is incident on the region Q13 of the polarization beam splitter surface 110a of the prism member 110. Since the second beam is converted into a p-polarized beam by the λ/2 plate 18, the beam is directly transmitted through the surface 110a and is incident on a region Q14 of the reflecting surface 110b. Thereafter, the second beam is incident on a region Q31 of the movable mirror 16 through the λ/4 plate 140.

The second beam reflected by the region Q31 of the movable mirror 16 is transmitted through the λ/4 plate 140 and is reflected by the region Q14 of the reflecting surface 110b of the prism member 110 again. The second beam is then incident on the region Q13 of the polarization beam splitter surface 110a. In this case, since the second beam is converted into an s-polarized beam with respect to the surface 110a upon reciprocating through the λ/4 plate 140, the beam is reflected by the region Q13 of the surface 110a. Thereafter, the second beam is incident on a region Q32 of the movable mirror 16 through the λ/4 plate 140. The second beam reflected by the region Q32 returns to the region Q13 of the polarization beam splitter surface 110a of the prism member 110 through the λ/4 plate 140. At this time, since the second beam is converted into a p-polarized beam upon reciprocating through the λ/4 plate 140, the beam is transmitted through the surface 110a and is incident on the receiver 10. In the receiver 10, the polarization directions of the first and second beams respectively reflected twice by the stationary mirror 15 and the movable mirror 16 are aligned by the analyzer so that the two beams are incident on the light-receiving element.

While the stationary mirror 15 and the movable mirror 16 are at rest relative to each other in the X direction, the light-receiving element of the receiver 10 outputs a beat signal having a frequency (f1−f2). When the two mirrors move relative to each other in the X direction, a frequency-modulated beat signal is output. Therefore, by accumulating such changes in frequency, the relative movement amount between the stationary mirror 15 and the movable mirror 16 in the X direction can be detected.

In this case, as is apparent from FIG. 3A, the first and second beams pass through the same optical path within the rectangular prism 120 of the prism member 110. Inside the rectangular prism 130 of the prism member 110, as shown in FIG. 3B, the first and second beams pass through optical paths T13 and T23, respectively. However, the lengths of the optical paths T13 and T23 are equal. Therefore, the optical path length difference between the first and second beams does not change even if a temperature difference is present between the rectangular prisms 120 and 130. That is, the relative movement amount between the stationary mirror 15 and the movable mirror 16 in the X direction can always be measured with high precision.

In the above-described embodiment, the present invention is applied to a heterodyne laser interferometer. However, the present invention can also be applied to a homodyne interferometer. In addition, a corner-cube prism and the like may be used in place of the rectangular prism 17.

Furthermore, in the embodiment shown in FIG. 3A, the λ/4 plate 140 is constituted by a single member. It is, however, apparent that λ/4 plates 140a to 140d can be respectively arranged in four optical paths through which beams reciprocate upon reflection at the regions Q21 and Q22 of the stationary mirror 15 and at the regions Q31 and Q32 of the movable mirror 16, as indicated by the broken lines.

Moreover, in the embodiment shown in FIG. 3A, the laser source 1 and the receiver 10 are arranged at the first surface side of the rectangular prism 120 having two orthogonal surfaces, whereas the λ/2 plate 18 and the rectangular prism 17 are arranged on the second surface side of the rectangular prism 120. However, the laser source 1 and the receiver 10 may be arranged on the second surface side, while the λ/2 plate 18 and the rectangular prism 17 are arranged on the first surface side. In addition, the positions of the laser source 1 and the receiver 10 may be switched from each other.

As has been described above, the present invention is not limited to the embodiments described above, and various changes and modifications can be made within the spirit and scope of the invention.

What is claimed is:

1. An interferometer apparatus for detecting a displacement amount of an object to be measured, comprising:
    light source means for supplying light;
    measurement reflecting means arranged to be movable with the object in a measurement direction;
    reference reflecting means fixed to be parallel to said measurement reflecting means;
    optical means for splitting the light from said light source means into a first light component and a second light component, and forming a measurement optical path extending to said measurement reflecting means through a gas by using the first light component, while forming a reference optical path extending, parallel to said measurement optical path, to said reference reflecting means through a gas by using the second light component; and
    detecting means for receiving the first light component having passed through the measurement optical path and the second light component having passed through the reference optical path, and detecting a displacement amount of the object,
    wherein said optical means includes a first rectangular prism having a light splitting surface for transmitting said first light component, which is a part of the light supplied by said light source means, and reflecting said second light component, which is a remainder of the light supplied by said light source means, and a reflecting surface formed to be perpendicular to the light splitting surface,
    a second rectangular prism joined to said light splitting surface and having first and second transmitting surfaces which are perpendicular to each other, and
    a deflecting member for deflecting a light component, reflected by said light splitting surface and coming out from said first transmitting surface, so as to guide the deflected light component to said light splitting surface through said first transmitting surface, and wherein
    the first light component which is emitted from said light source means and transmitted through the light splitting surface, forms said measurement optical path which goes by way of said measurement reflecting means and comes out of said second transmitting surface to reach said detecting means, in cooperation with said light splitting surface, said reflecting surface, said first transmitting surface, said measurement reflecting means and said deflecting member,
    the second light component which is emitted from said light source means and reflected by said light splitting surface, forms said reference optical path which goes by way of said reference reflecting means and comes out of said second transmitting surface to reach said detecting means, in cooperation with said light splitting surface, said reflecting surface, said first transmitting surface, said reference reflecting means and said deflecting member,
    said measurement optical path from the second transmitting surface to the detecting means coincides with said reference optical path from the second transmitting surface to the deflecting member,
    the optical path length of said measurement optical path through said first rectangular prism is equal to the optical path length of said reference optical path through said first rectangular prism, and the optical path length of said measurement optical path through said second rectangular prism is equal to the optical path length of said reference optical path through said second rectangular prism.

2. An apparatus according to claim 1, wherein the light splitting surface is constituted by a polarizing/splitting surface for polarizing/splitting the light from said light source.

3. An apparatus according to claim 2, wherein said optical means comprises λ/4 plates respectively arranged in the measurement optical path formed between said first rectangular prism and said measurement reflecting means, and in the reference optical path formed between said first rectangular prism and said reference reflecting means.

4. An apparatus according to claim 3, wherein said optical means comprises a λ/2 plate arranged in either of optical paths formed between said second rectangular prism and said deflecting member, one optical path extending from the second rectangular prism to said deflecting member, and the other optical path extending from said deflecting member to the second rectangular prism.

5. An apparatus according to claim 3, wherein said optical means comprises λ/4 plates respectively arranged in optical paths formed between said second rectangular prism and said deflecting member, one optical path extending from the second rectangular prism to said deflecting member, and the other optical path extending from said deflecting member to the second rectangular prism.

6. An apparatus according to claim 1, wherein the light splitting surface is constituted by a polarizing/splitting surface for polarizing/splitting the light from said light source means, and said optical means comprises λ/4 plates respectively arranged in the measurement optical path formed between said first rectangular prism and said measurement reflecting means, and in the reference optical path formed between said first rectangular prism and said reference reflecting means.

7. An apparatus according to claim 6, wherein said optical means comprises a λ/2 plate arranged in either of optical paths formed between said second rectangular prism and said deflecting member, one optical path extending from the second rectangular prism to said deflecting member, and the other optical path extending from said deflecting member to the second rectangular prism.

8. An apparatus according to claim 7, wherein said first rectangular prism and said second rectangular prism are arranged such that a ridge defined by the light splitting surface and the reflecting surface of said first rectangular prism is parallel to a ridge defined by the first and second transmitting surfaces of said second rectangular prism.

9. An apparatus according to claim 8, wherein said deflecting member includes two reflecting surfaces so as to guide the light coming out from said first transmitting surface of said second rectangular prism to said first transmitting surface of said second rectangular prism again, and wherein said first rectangular prism and said second rectangular prism are arranged such that a ridge defined by said light splitting surface and said reflecting surface of said first rectangular prism is perpendicular to a ridge defined by said two reflecting surfaces of said deflecting member.

10. An apparatus according to claim 9, wherein said optical means further includes a second deflecting member for deflecting said measurement optical path which comes out of said second transmitting surface of said second rectangular prism so as to re-form a measurement optical path which goes by way of said measurement reflecting means again, and for also deflecting said reference optical path which comes out of said second transmitting surface of said second rectangular prism so as to re-form a reference optical path which goes by way of said reference reflecting means again.

11. An apparatus according to claim 6, wherein said optical means comprises λ/4 plates respectively arranged in optical paths formed between said second rectangular prism and said deflecting member, one optical path extending from the second rectangular prism to said deflecting member, and the other optical path extending from said deflecting member to the second rectangular prism.

12. An apparatus according to claim 11, wherein said first rectangular prism and said second rectangular prism are arranged such that a ridge defined by the light splitting surface and the reflecting surface of said first rectangular prism is parallel to a ridge defined by the first and second transmitting surfaces of said second rectangular prism.

13. An apparatus according to claim 12, wherein said deflecting member includes two reflecting surfaces so as to guide the light coming out from said first transmitting surface of said second rectangular prism to said first transmitting surface of said second rectangular prism again, and wherein said first rectangular prism and said second rectangular prism are arranged such that a ridge defined by said light splitting surface and said reflecting surface of said first rectangular prism is perpendicular to a ridge defined by said two reflecting surfaces of said deflecting member.

14. An apparatus according to claim 13, wherein said optical means further includes a second deflecting member for deflecting said measurement optical path which comes out of said second transmitting surface of said second rectangular prism so as to re-form a measurement optical path which goes by way of said target object again, and for also deflecting said reference optical path which comes out of said second transmitting surface of said second rectangular prism so as to re-form a reference optical path which goes by way of said reference reflecting means again.

15. An apparatus according to claim 1, wherein said optical means further includes a second deflecting member for deflecting said measurement optical path which comes out of said second transmitting surface of said second rectangular prism so as to re-form a measurement optical path which goes by way of said measurement reflecting means again, and for also deflecting said reference optical path which comes out of said second transmitting surface of said second rectangular prism so as to re-form a reference optical path which goes by way of said reference reflecting means again.

16. An interferometer apparatus for detecting a displacement amount of a target object to be measured, comprising:

light source means for supplying light;

optical means for splitting the light from said light source means into a first light component and a second light component, and forming a measurement optical path extending to the target object through a gas by using the first light component, while forming a reference optical path extending to a reference object through a gas by using the second light component; and detecting means for detecting a displacement amount of the target object by using the first light component having passed through the measurement optical path and the second light component having passed through the reference optical path, wherein said optical means includes a first rectangular prism having a light splitting surface for transmitting said first light component, which is a part of the light supplied by said light source means, and reflecting said second light component, which is a remainder of the light supplied by said light source means, and a reflecting surface formed to be perpendicular to the light splitting surface, and a second rectangular prism joined to said light splitting surface and having first and second transmitting surfaces which are perpendicular to each other, and a deflecting member for deflecting a light component, reflected by said light splitting surface and coming out from said first transmitting surface, so as to guide the deflected light component to said light splitting surface through said first transmitting surface, and wherein the first light component which is emitted from said light source means and transmitted through said light splitting surface, forms said measurement optical path which goes by way of said target object and comes out of said second transmitting surface to reach said detecting means, in cooperation with said light splitting surface, said reflecting surface, said first transmitting surface, said target object and said deflecting member, the second light component which is emitted from said light source means and reflected by said light splitting surface, forms said reference optical path which goes by way of said reference object and comes out of said second transmitting surface to reach said detecting means, in cooperation with said light splitting surface, said reflecting surface, said first transmitting surface, said reference object and said deflecting member, said measurement optical path from the second transmitting surface to the detecting means coincides with said reference optical path from the second transmitting surface to the deflecting member, the optical path length of said measurement optical path through said first rectangular prism is equal to the optical path length of said reference optical path through said first rectangular prism, and the optical path length of said measurement optical path through said second rectangular prism is equal to the optical path length of said reference optical path through said second rectangular prism.

17. An apparatus according to claim 16, wherein the light splitting surface is constituted by a polarizing/splitting surface for polarizing/splitting the light from said light source, and said optical means comprises $\lambda/4$ plates respectively arranged in the measurement optical path formed between said first rectangular prism and said measurement reflecting means, and in the reference optical path formed between said first rectangular prism and said reference reflecting means.

18. An apparatus according to claim 17, wherein said optical means comprises a $\lambda/2$ plate arranged in either of optical paths formed between said second rectangular prism and said deflecting member, one optical path extending from the second rectangular prism to said deflecting member, and the other optical path extending from said deflecting member to the second rectangular prism.

19. An apparatus according to claim 18, wherein said optical means further includes a second deflecting member for deflecting said measurement optical path which comes out of said second transmitting surface of said second rectangular prism so as to re-form a measurement optical path which goes by way of said target object again, and for also deflecting said reference optical path which comes out of said second transmitting surface of said second rectangular prism so as to re-form a reference optical path which goes by way of said reference object again.

20. An apparatus according to claim 17, wherein said optical means comprises $\lambda/4$ plates respectively arranged in optical paths formed between said second rectangular prism and said deflecting member, one optical path extending from the second rectangular prism to said deflecting member, and the other optical path extending from said deflecting member to the second rectangular prism.

21. An apparatus according to claim 20, wherein said optical means further includes a second deflecting member for deflecting said measurement optical path which comes out of said second transmitting surface of said second rectangular prism so as to re-form a measurement optical path which goes by way of said target object again, and for also deflecting said reference optical path which comes out of said second transmitting surface of said second rectangular prism so as to re-form a reference optical path which goes by way of said reference object again.

22. An interferometer apparatus for detecting a relative movement amount between first and second objects, comprising:

light source means for supplying light;

optical means for splitting the light from said light source means into first and second beams, and forming a first optical path extending to the first object through a gas by using the first beam, while forming a second optical path extending, parallel to the first optical path, to the second object through a gas by using the second beam; and detecting means for detecting a relative movement amount between the first and second objects by using the first and second beams respectively having passed through the first and second optical paths, wherein said optical means comprises a first rectangular prism having a light splitting surface for transmitting part of the light from said light source means as the first beam and reflecting the remaining part of the light as the second beam, and a reflecting surface formed to be perpendicular to the light splitting surface, and a second rectangular prism joined to said light splitting surface and having first and second transmitting surfaces which are perpendicular to each other, and a deflecting member for deflecting a beam, reflected by said light splitting surface and coming out from said first transmitting surface, so as to guide the deflected beam to said light splitting surface through said first transmitting surface, and wherein, the first beam which is emitted from said light source means and transmitted through said light splitting surface, forms said first optical path which goes by way of said first object and comes out of said second transmitting surface to reach said detecting means, in cooperation with said light splitting surface, said first transmitting surface, said first object and said deflecting member, the second beam which is emitted from said light source means and reflected by said light splitting surface, forms said second optical path which goes by way of said second object and comes out of said second transmitting surface to reach said detecting means, in cooperation with said light splitting surface, said reflecting surface, said first transmitting surface, said second object and said deflecting member, said first optical path from the second transmitting surface to the detecting means coincides with said second optical path from the second transmitting surface to the deflecting member, the optical path length of said first optical path through said first rectangular prism is equal to the optical path length of said second optical path through said first rectangular prism, and the optical path length of said first optical path through said second rectangular prism is equal to the optical path length of said second optical path through said second rectangular prism.

23. An apparatus according to claim 22, wherein the light splitting surface is constituted by a polarizing/splitting surface for polarizing/splitting the light from said light source, and said optical means comprises $\lambda/4$ plates respectively arranged in the first optical path formed between said first rectangular prism and the first object, and in the second optical path formed between said first rectangular prism and the second object.

24. An apparatus according to claim 23, wherein said optical means comprises a $\lambda/2$ plate arranged in either of optical paths formed between said second rectangular prism and said deflecting member, one optical path extending from the second rectangular prism to said deflecting member, and the other optical path extending from said deflecting member to the second rectangular prism.

25. An apparatus according to claim 24, wherein said optical means comprises $\lambda/4$ plates respectively arranged in optical paths formed between said second rectangular prism and said deflecting member, one optical path extending from the polarizing/splitting surface to said deflecting member, and the other optical path extending from said deflecting member to the second rectangular prism.

26. An apparatus according to claim 22, wherein said optical means further includes a second deflecting member for deflecting said first optical path which comes out of said second transmitting surface of said second rectangular prism so as to re-form a first optical path which goes by way of said first object again, and for also deflecting said second optical path which comes out of said second transmitting surface of said second rectangular prism so as to re-form a reference optical path which goes by way of said second object again.

27. An interferometer apparatus for detecting a relative movement amount between first and second reflecting members, comprising:

light source means for supplying light;

optical means for splitting the light from said light source means into first and second beams, and forming a first optical path extending to the first reflecting member through a gas by using the first beam, while forming a second optical path extending, parallel to the first optical path, to the second reflecting member through a gas by using the second beam; and detecting means for detecting a relative movement amount between the first and second reflecting members by using the first and second beams respectively having passed through the first and second optical paths, wherein said optical means comprises a first rectangular prism having a light splitting surface for transmitting part of the light from said light source means as the first beam and reflecting the remaining part of the light as the second beam, and a reflecting surface formed to be perpendicular to the light splitting surface, a second rectangular prism joined to said light splitting surface and having first and second transmitting surfaces which are perpendicular to each other, and a deflecting member for deflecting a beam, reflected by said light splitting surface and coming out from said first transmitting surface so as to guide the deflected beam to said light splitting surface through said first transmitting surface, and wherein the first beam which is emitted from said light source means and transmitted through said light splitting surface, forms said first optical path which goes by way of said first reflecting member and comes out of said second transmitting surface to reach said detecting means, in cooperation with said light splitting surface, said reflecting surface, said first transmitting surface, said first reflecting member and said deflecting member, the second beam which is emitted from said light source means and reflected by said light splitting surface, forms said second optical path which goes by way of said second reflecting member and comes out of said second transmitting surface to reach said detecting means, in cooperation with said light splitting surface, said reflecting surface, said first transmitting surface, said second reflecting member and said deflecting member, said first optical path from the second transmitting surface to the detecting means coincides with said second optical path from the second transmitting surface to the deflecting member, the optical path length of said first optical path through said first rectangular prism is equal to the optical path length of said second optical path through said first rectangular prism, and the optical path length of said first optical path through said second rectangular prism is equal to the optical path length of said second optical path through said second rectangular prism.

* * * * *